Sept. 29, 1925.

F. KIRSCHNER 1,555,296

PROCESS OF MANUFACTURING METAL GOODS

Filed Oct. 12, 1923

Felix Kirschner
INVENTOR his ATTORNEY

Patented Sept. 29, 1925.

1,555,296

UNITED STATES PATENT OFFICE.

FELIX KIRSCHNER, OF VIENNA, AUSTRIA.

PROCESS OF MANUFACTURING METAL GOODS.

Application filed October 12, 1923. Serial No. 668,161.

*To all whom it may concern:*

Be it known that I, FELIX KIRSCHNER, subject of the Republic of Switzerland, residing at Vienna, XVII, Dornbacherstrasse 72, Austria, have invented certain new and useful Improvements in Processes of Manufacturing Metal Goods, of which the following is a specification.

This invention relates to a process by which it is possible, by simple means capable of being carried out on a very large scale, to make the very finest woven, plaited or the like articles of metal strong and resisting, so that the goods cannot easily be torn or damaged and any extension of damage already done is prevented, whilst at the same time their quality in permeability is improved. These results are of very great importance in the use for technical purposes of all woven, plaited and the like goods that are made out of fine wire, metal strips and the like, and in particular for metal sieves and metal cloths of the finer grades. The dipping of the goods into baths of fused metal as is often done in a case of coarser woven and plaited goods made of thick wire or thick strips of metal is quite out of the question in the case of the finer goods under consideration, as if a fine wire sieve, for example, is dipped in a bath of fused metal, the fine meshes are entirely closed up and the sieve is in this way converted into an impermeable sheet.

The process forming the subject of the present invention can be carried out in a variety of ways. A woven or plaited article of bright wire or metal strip can, for example, first be galvanically provided with a coating of a metal or metal alloy adapted to form a solder and thereafter the wire or metal strip elements of the goods, at the points where they cross or come into contact with or closely adjoin one another, are soldered by means of the galvanic coating acting as solder metal. The invention can also be carried out by making the woven or plaited or the like goods out of wire or metal strips the surface of which has already been coated with a metal capable of acting as a solder and thereafter the points of contact or points where the wire or strip elements cross are soldered by means of the solder metal on their surface.

Below is described one application of the process to the manufacture of metal fabrics such as metal sieves or the like of fine grade, where tin for example galvanically applied is used as the soldering metal.

Figure 1:
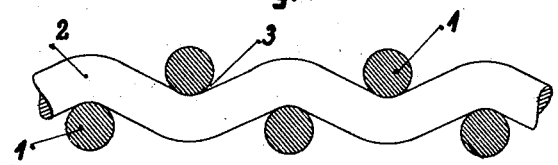
Figure 2:
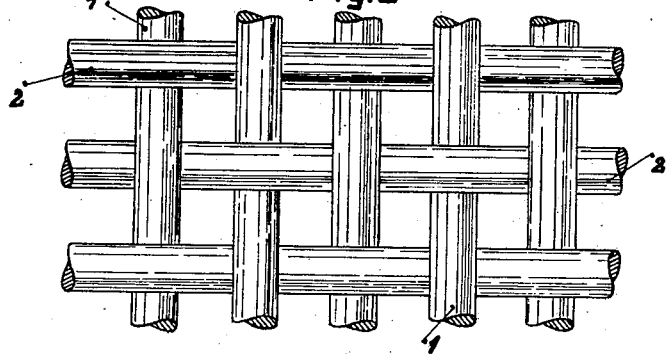
Figures 3, 5:
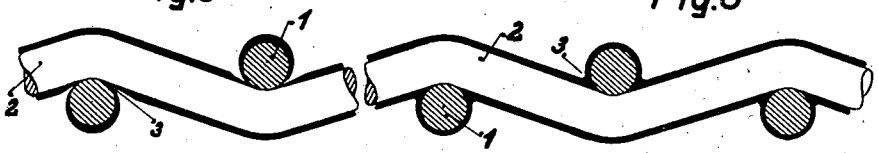

In the accompanying drawing, Fig. 1 is a cross section, and Fig. 2 a plan, both on a greatly enlarged scale of a sieve with strands of hair of like fineness, constituting the clean starting product of the process; Fig. 3 is a cross section; and Fig. 4 a plan of the intermediate product which results from galvanizing the starting product of Figs. 1 and 2; Fig. 5 is a cross section; and Fig. 6 a plan of the final product, consisting of a sieve with strands of hair of like fineness secured together by the process of the present invention.

The metallic fabric is freed from grease and oxides and put into a galvanic tin bath, preferably one which allows the use of high currents. The weight of the tin coating applied is so determined that when the soldering process is applied later there is sufficient solder material at the points where the wires or metal strips cross one another or come in contact to ensure that at these points a strong solder connection of the elements is formed. The metal fabric can, of course, be provided with a heavier tin coating than is necessary for the strong soldering of the points of contact and crossing points of the metal goods. This heavier coating can, for example, be applied with great advantage in many cases in order to effect a further and finely regulable reduction in size of the meshes of the metal article, while at the same time effecting the soldering of the crossing and contacting metal elements. The wire fabric is preferably fed in continuous operation from a coil or roll, through the galvanic bath, and then, after the application of a solder fluid or paste is led through a solder furnace of any known or suitable kind with or without water cooling, and since the finished product possesses good flexibility, the finished article can be rolled up. In this process the crossing and contacting points of the wire or metal strip elements are soldered in their places in areas in the continuous progress of the goods through the soldering furnace.

Instead of with the solder fluxes commonly employed, the fusing of the galvanic coating can with great advantage be effected with the assistance of a specially prepared flux, consisting for example of ammonium chloride, hydrochloric acid and such metal salt solutions as are capable of precipitating upon the galvanic coating the metal of the metal salt solution. A suitable composition for the flux is the following: 10 to 30 parts by weight of concentrated hydrochloric acid, 10 to 40 parts by weight of ferric chloride solution (30 to 70%), 20 to 40 parts by weight of concentrated ammonium chloride solution, and 20 to 40 parts by weight of a 5 to 20% copper sulphate solution.

When this flux is used the process can also be carried on continuously. The wire fabric is in this case first of all led through the galvanic bath and after leaving the bath is sprayed with water, the flux is then applied in a finely divided state to the metal fabric and the goods thus treated are exposed to a temperature at which the tin coating with the assistance of the flux fuses on to the wire fabric.

Another application of the process according to the present invention is the following. Wire or metal strip elements are first of all provided by means of any metallizing process with a surface adapted to act as a solder and these elements are then manufactured into the desired product by weaving, plaiting or the like and afterwards the crossing or contacting wires or strips are soldered together by means of the metal in their solder forming surfaces. This process can with advantage be employed particularly for such articles as in their finished form are difficult to galvanize, as for example articles which in consequence of their shape or structure have surfaces running one beneath another, which would not be satisfactorily coated in the galvanizing process in consequence of the unfavourable distribution of current lines.

The process according to the present invention, particularly as embodied in the first example given above, produces quite new industrial productions for the fine metal fabric industry, for hitherto woven fabrics formed of fine wire with quite small meshes could not be made in a form that was not easily torn or damaged. In addition to this, however, the new process brings about a surprising improvement in the permeability of such goods, even those of the finest fabric, such as sieves and the like, whether solid or liquid material is to be sieved or filtered.

Figs. 1 and 2 of the drawing show clearly that the warp strands 1 and weft strands 2 of the mesh heretofore commonly employed have no connection with each other at the places of intersection, and are therefore relatively movable. Fig. 1 also shows clearly that at the intersections of the strands 1 and 2 certain spaces or interstices 3 are present. In sieving dry materials or straining materials containing liquids, a deposit is formed in these interstices and this deposit, I find, is the cause of stoppage of the mesh.

Figures 4, 6:
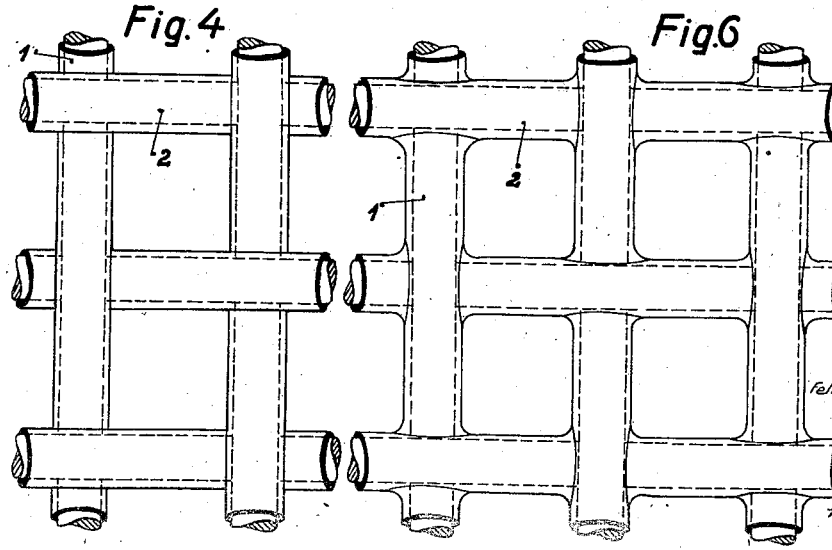

When the article shown in Figs. 1 and 2 is galvanized an intermediate product, like that shown in Figs. 3 and 4, results. At the intersections of the strands 1 and 2, the galvanic coating is less than elsewhere, because during the galvanic action the current is deflected at the intersections, and consequently a coating of less thickness than elsewhere is deposited in the interstices 3. As shown in Fig. 4, the space defined by the crossed strands is angular. Upon further treating this intermediate product, in the manner above described, the interstices 3 are filled and rounded out by the molten material and at the same time the strands 1 and 2 are firmly connected together at the intersections.

It developed in practice that the molten coating metal fills out the interstices 3 and the parts adjacent thereto so that a rounded mesh contour (Fig. 6) results, which materially reduces the danger of stoppage of the sieve. I have also found that when galvanically applied metals are used and are fused onto the strands with the aid of suitable fluxes, the filling out or rounding off of the inner walls of the mesh is greatly facilitated.

What is claimed is:

1. The herein described method of securing and stiffening metallic wares composed of adjacently lying or inter-secured metal elements, which consists in galvanically providing the bare elements with an easily fusible metallic coating, and thereupon fusing the coating to the elements to unite the latter rigidly at their intersections, the metal of said coating being of sufficient strength to produce an undistortable final product.

2. The herein described method of securing and stiffening metallic wares composed of adjacently lying or inter-secured metal elements, which consists in weaving metal strands to form the article, said strands being of material having an easily fusible surface, and thereupon fusing the material of said surface to unite the strands rigidly at their intersections whereby an undistortable final product is produced.

3. The herein described method of securing and stiffening metallic wares composed of adjacently lying or inter-secured metal elements, which consists in inter-weaving metal strands, coating the woven material with metal, and subjecting successive areas of the material to heat in order to fuse the coating and thereby unite the strands rigidly at their intersections.

4. The herein described method of securing and stiffening metallic wares composed of adjacently lying or inter-secured metal elements, which consists in inter-weaving metal strands, coating the woven material with metal, adding flux to the material, and fusing the coating to the material with the aid of the flux to unite the strands rigidly at their intersections.

5. The herein described method of securing and stiffening metallic wares composed of adjacently lying or inter-secured metal elements, which consists in inter-weaving metal strands, galvanically coating the woven material with an easily fusible metal until the meshes are reduced to a desired size, and fusing the coating to the material to unite the strands rigidly at their intersections.

6. The herein described method of securing and stiffening metallic wares composed of adjacently lying or inter-secured metal elements, which consists in inter-weaving metal strands, galvanically coating the woven material with an easily fusible metal until the meshes are reduced to a desired size, and fusing the coating to the material to fill the interstices between inter-weaving strands at their intersections with the fused metal.

7. The herein described method of securing and stiffening metallic wares composed of adjacently lying or inter-secured metal elements, which consists in inter-weaving metal strands, electrolytically coating the woven material with easily fusible metal, adding flux to the material, and fusing the coating to the material with the aid of the flux to unite the strands rigidly at their intersections.

8. The herein described method of securing and stiffening metallic wares composed of adjacently lying or inter-secured metal elements, which consists in inter-weaving metal strands, electrolytically coating the woven material with easily fusible metal, adding flux to the material, said flux containing metal salt solutions capable of precipitating the metal of said solutions upon the coating; and fusing the coating to the material with the aid of the flux to unite the strands rigidly at their intersections.

In testimony whereof I affix my signature.

FELIX KIRSCHNER.